(12) United States Patent
Vahid Far et al.

(10) Patent No.: US 10,923,016 B2
(45) Date of Patent: Feb. 16, 2021

(54) CONTROLLING EMISSION RATES IN DIGITAL DISPLAYS

(71) Applicant: Apple Inc., Cupertino, CA (US)

(72) Inventors: Mohammad B. Vahid Far, San Jose, CA (US); Tore Nauta, Santa Cruz, CA (US); Hopil Bae, Palo Alto, CA (US); Mahdi Farrokh Baroughi, Santa Clara, CA (US); Jun Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/334,698

(22) PCT Filed: Sep. 13, 2017

(86) PCT No.: PCT/US2017/051372
§ 371 (c)(1),
(2) Date: Mar. 19, 2019

(87) PCT Pub. No.: WO2018/053007
PCT Pub. Date: Mar. 22, 2018

(65) Prior Publication Data
US 2019/0279553 A1 Sep. 12, 2019

Related U.S. Application Data

(60) Provisional application No. 62/396,692, filed on Sep. 19, 2016.

(51) Int. Cl.
*G09G 3/20* (2006.01)
*G09G 3/3225* (2016.01)
(Continued)

(52) U.S. Cl.
CPC ....... *G09G 3/2022* (2013.01); *G06F 3/04166* (2019.05); *G09G 3/2033* (2013.01);
(Continued)

(58) Field of Classification Search
CPC ........ C08G 64/06; F21S 41/28; F21S 41/141; C08K 5/005; B29C 45/0001;
(Continued)

(56) References Cited

U.S. PATENT DOCUMENTS 6,297,788 B1 10/2001 Shigeta et al.
6,396,508 B1 5/2002 Noecker
(Continued)

OTHER PUBLICATIONS

International Search Report and Written Opinion for PCT Application No. PCT/US2017/051372 dated Nov. 6, 2017.

*Primary Examiner* — Patrick N Edouard
*Assistant Examiner* — Joseph P Fox
(74) *Attorney, Agent, or Firm* — Fletcher Yoder, P.C.

(57) ABSTRACT

A display device may include pixels that display image data. The display device may also include a circuit that receives pixel data having a gray level for at least one pixel, such that the pixel data corresponds to a frame of the image data and the frame includes sub-frames. The pixel data causes the circuit to provide at least one current pulse to the at least one pixel according to a first order of the sub-frames. The circuit may also receive a second order of the sub-frames, such that the second order is mapped with respect to the first order, and at least one current pulse is provided to the at least one pixel according to the second order. As such, visual artifacts depicted on the display are reduced.

20 Claims, 13 Drawing Sheets

(51) Int. Cl.
*G06F 3/041* (2006.01)
*G09G 3/3233* (2016.01)

(52) U.S. Cl.
CPC ......... *G09G 3/2044* (2013.01); *G09G 3/3225* (2013.01); *G09G 3/3233* (2013.01); *G09G 2300/0804* (2013.01); *G09G 2310/0278* (2013.01); *G09G 2310/08* (2013.01); *G09G 2320/0247* (2013.01); *G09G 2320/0266* (2013.01); *G09G 2354/00* (2013.01)

(58) Field of Classification Search
CPC ........ B29K 2069/00; B29K 2995/0026; B29L 2031/3406; C08L 69/00; C08L 2201/10; G09G 3/2022; G09G 3/2044; G09G 3/3225; G09G 3/2033; G09G 3/3233; G09G 2300/0804; G09G 2310/0278; G09G 2354/00; G09G 2310/08; G09G 2320/0247; G09G 2320/0266; G06F 3/04166

See application file for complete search history.

(56) References Cited

U.S. PATENT DOCUMENTS

| | | |
|---|---|---|
| 6,784,898 B2 | 8/2004 | Lee et al. |
| 7,190,380 B2 | 3/2007 | Damera-Venkata et al. |
| 8,013,820 B2 | 9/2011 | Goetz et al. |
| 2002/0011974 A1* | 1/2002 | Holtslag ................ G09G 3/30 345/76 |
| 2002/0140364 A1 | 10/2002 | Inukai |
| 2003/0063054 A1* | 4/2003 | Inukai ................ G09G 3/3233 345/83 |
| 2013/0002729 A1 | 1/2013 | Lee et al. |
| 2015/0187252 A1 | 7/2015 | Ishii et al. |
| 2015/0302795 A1 | 10/2015 | Genoe |

* cited by examiner

US 10,923,016 B2

CONTROLLING EMISSION RATES IN DIGITAL DISPLAYS

CROSS REFERENCE TO RELATED APPLICATION

This application is a national stage filing of PCT Application Serial No. PCT/US2017/051372, filed Sep. 13, 2017, and entitled "Controlling Emission Rates in Digital Displays," which claims priority from and the benefit of U.S. Provisional Application Ser. No. 62/396,692, filed Sep. 19, 2016, and entitled "Controlling Emission Rates in Digital Displays," both of which are incorporated by reference herein in their entireties.

BACKGROUND

The present disclosure relates generally to electronic display devices that depict image data. More specifically, the present disclosure relates to systems and methods for controlling emission rates to control pixels and/or sub-pixels in electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As electronic displays are employed in a variety of electronic devices, such as mobile phones, televisions, tablet computing devices, and the like, manufacturers of the electronic displays continuously seek ways to improve the power use efficiencies in the displays. In a given display device, a number of circuit components are employed to depict a certain gray level for display by each pixel of a display. When programing or controlling each respective pixel, it may be useful to control the input signals provided to each pixel circuit in such a manner to reduce artifacts that may be presented on the display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain electronic display devices, light-emitting diodes such as organic light-emitting diodes (OLEDs), micro-LEDs (μLEDs), or active matrix organic light-emitting diodes (AMOLEDs) may be employed as pixels to depict a range of gray levels for display. Each pixel or sub-pixel of an LED (e.g., μ-LED sub-pixels) may be controlled by a pixel driving circuit, which may be referred to as a micro-driver (μDs). It should be noted that a pixel driving circuit may drive any suitable LED include μ-LEDs or OLEDs. The micro-driver may control the gray level depicted by the respective pixel using a digital scheme, which may include providing a constant current value to the respective μ-LED of the respective sub-pixel for a certain amount of time, such that the gray level depicted by the pixel directly corresponds to the amount of time that the current is provided to the respective sub-pixel. With this in mind, the μ-LED may not accurately depict the requested gray level for low gray levels (e.g., 0-16 in 8-bit pixel data) because the amount of time (e.g., pulses) that the current is provided to the μ-LED may be too short. As such, in order to improve the depiction of lower gray levels, the micro-driver may provide currents with higher values to the μ-LED when a pixel is to depict certain gray levels that are lower than some threshold, as compared to when providing current to the μ-LED when the pixel is to depict certain gray levels that are greater than some threshold. Although the higher current may assist in portraying the requested gray level, the relatively short amount of time in which the μ-LED receives the high current may cause a viewer of the display to observe certain display artifacts (e.g., flicker) that may distract the viewer.

To reduce these display artifacts from being observed by the viewer, a timing controller or other component that may be part of the display driver may effectively increase the emission rate frequency in which the pixel data may present image data via a display to a rate that is greater than 60 Hz. In one embodiment, the timing controller may effectively increase the emission rate frequency of a display having a 60 Hz frame rate by partitioning each frame into 16 sub-frames (e.g., sub-frames 0-15), thereby effectively increasing the effective emission frame rate to 960 Hz. The timing controller may use pulse-width modulation pulses in each sub-frame to cause the μ-LED to display a certain gray level. That is, during each sub-frame, the timing controller may provide a certain pulse-width modulated signal that may represent a digital value (e.g., 4-bit).

When employing the sub-frame partition technique described above, the micro-driver may receive pixel data along with sub-frame counts and may provide current pulses to a respective μ-LED to depict a gray level of 1 by providing one pulse during the last sub-frame (e.g., sub-frame 15) of the frame. Since the gray level output by the μ-LED corresponds to the amount of time in which the μ-LED receives a current, the lone pulse in the last sub-frame of the frame may cause the μ-LED to emit a gray level of 1. In the same manner, a gray level of 2 may be generated in a respective LED by the micro-driver by providing a pulse in the second to last sub-frame (e.g., sub-frame 14) and the last sub-frame (e.g., sub-frame 15). Under this scheme, when the micro-driver attempts to depict certain gray levels below a certain threshold (e.g., gray level 8), the current provided to the respective μ-LED is provided in short pulses towards the end of a respective frame that continue to produce in visual artifacts.

In one embodiment, a scrambler circuit within the micro-driver or within another suitable device that coordinates the manner in which pulses are provided during certain sub-frames may map the sub-frames (e.g., sub-frames 0-15) of each frame of image data into a scrambled order. That is, scrambler circuit may map certain sub-frame time slots to different sub-frame time slots during each frame in such a manner to evenly distributed pulse-width modulated signals throughout the entire frame for each potential gray level value. For instance, the scrambler circuit may map original sub-frame 14 to sub-frame 7, which is positioned closer to the middle of the respective frame. After the scrambler circuit maps the original sub-frame positions to new sub-frame positions, the micro-driver may provide pulses to depict a respective gray level according to the mapped sub-frame positions. Using the example provided above, when depicting a gray level 2, instead of providing pulses during each of the last two original sub-frame positions (e.g., sub-frames 14 and 15), the micro-driver may instead provide the pulses of current used to produce a gray level 2 value during times that correspond to original sub-frame positions 7 and 15. Since the pulses for gray level 2 are no longer provided at the end of the frame, the visual artifacts previously visible to a viewer of the display are reduced because the pulses are distributed more evenly across the entire frame. Additional details with regard to scrambling the order in which a pixel driver circuit may emit pulses of current to a respective LED will be discussed below with reference to FIGS. 1-16.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
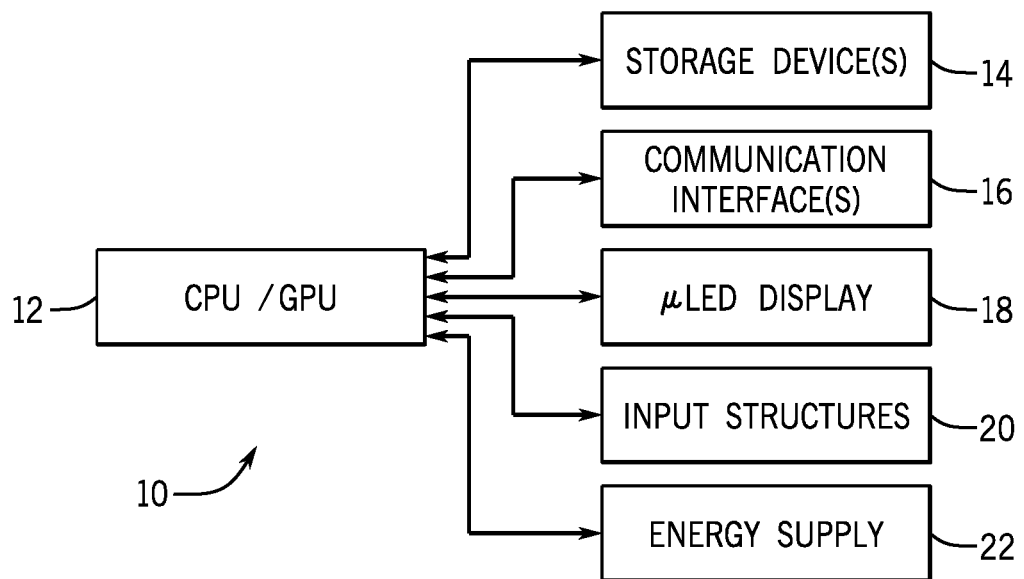
FIG. 1 is a block diagram of components of an electronic device that may include a micro-light-emitting-diode (µ-LED) display, in accordance with embodiments described herein.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Row drivers and column drivers may be used to distribute clock and/or emission controls and image data for an electronic display. In particular, the row and column drivers, in combination, enable the display to accurately pinpoint intersections where pixels may be programmed. For example, a micro-driver may be located at a row and column intersection accessible to the row and column drivers. Each micro-driver may drive multiple pixels, each of which may include several sub-pixels (e.g., red, green, and blue sub-pixels). The sub-pixels may be self-emissive organic light emitting diodes (OLEDs) or micro-light-emitting-diodes (µ-LEDs).

Generally, micro-light-emitting-diode (µ-LED) display devices are current driven devices and use current sources to provide certain amount of current to a respective pixel electrode for a certain amount of time to generate a certain level of luminance. With this in mind, micro-drivers may use pulse width modulation (PWM) to digitally control the gray level depicted by the respective pixel. In some instances, a display driver circuit may provide an emission clock signal to a micro-driver that controls an emission of a respective pixel.

In operation, the micro-driver may receive pixel data that indicates a desired gray level for a respective pixel depicting some image data. The micro-driver may use an emission clock circuit to control an amount of time in which the respective pixel may receive a certain current value, thereby controlling the gray level depicted by the respective pixel. That is, the micro-driver may emit a number of pulses of current to a respective µ-LED of a respective pixel during a frame of image data. As mentioned above, in some embodiments, each frame of image data may be partitioned into a number of sub-frames. The micro-driver may use the sub-frames in each frame to effectively increase the emission rate of the display. To ensure that the low gray levels do not create any display artifacts, certain circuitry may be added to the micro-driver or other suitable device to scramble the times slots or sub-frames in which the pulses of current are provided to the respective µ-LED. By scrambling the order of sub-frames in which the micro-driver provides pulses to depict a gray level, the scrambler circuit may evenly distribute short high-current pulses that cause a respective µ-LED to depict a certain gray level throughout the duration of a frame. As a result, the low gray levels of image data depicted on the display may not produce a significant amount of visual artifacts.

By way of introduction, suitable electronic devices that may include a micro-LED (µ-LED or u-LED) display are discussed below with reference to FIGS. 1-4. One example of a suitable electronic device 10 may include, among other things, processor(s) such as a central processing unit (CPU) and/or graphics processing unit (GPU) 12, storage device(s) 14, communication interface(s) 16, a µ-LED display 18, input structures 20, and an energy supply 22. The blocks shown in FIG. 1 may each represent hardware, software, or a combination of both hardware and software. The electronic device 10 may include more or fewer components. It should be appreciated that FIG. 1 merely provides one example of a particular implementation of the electronic device 10.

The CPU/GPU 12 of the electronic device 10 may perform various data processing operations, including generating and/or processing image data for display on the display 18, in combination with the storage device(s) 14. For example, instructions that can be executed by the CPU/GPU 12 may be stored on the storage device(s) 14. The storage device(s) 14 thus may represent any suitable tangible, computer-readable media. The storage device(s) 14 may be volatile and/or non-volatile. By way of example, the storage device(s) 14 may include random-access memory, read-only memory, flash memory, a hard drive, and so forth.

The electronic device 10 may use the communication interface(s) 16 to communicate with various other electronic devices or components. The communication interface(s) 16 may include input/output (I/O) interfaces and/or network interfaces. Such network interfaces may include those for a personal area network (PAN) such as Bluetooth, a local area network (LAN) or wireless local area network (WLAN) such as Wi-Fi, and/or for a wide area network (WAN) such as a long-term evolution (LTE) cellular network.

Using pixels containing an arrangement of pixels made up of µ-LEDs, the display 18 may display images generated by the CPU/GPU 12. The display 18 may include touchscreen functionality to allow users to interact with a user interface appearing on the display 18. Input structures 20 may also allow a user to interact with the electronic device 10. For instance, the input structures 20 may represent hardware buttons. The energy supply 22 may include any suitable source of energy for the electronic device. This may include a battery within the electronic device 10 and/or a power conversion device to accept alternating current (AC) power from a power outlet.

Figure 2:
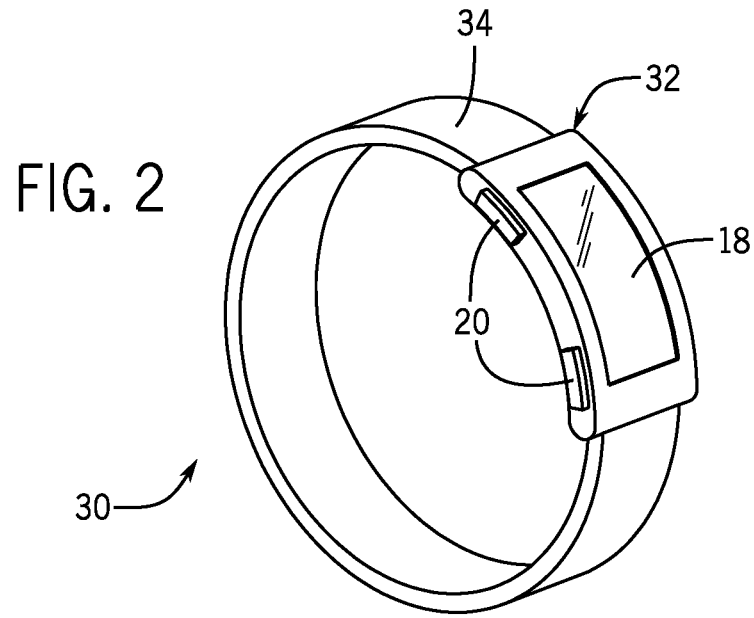
FIG. 2 is a perspective view of the electronic device in the form of a fitness band, in in accordance with embodiments described herein.
Figure 3:
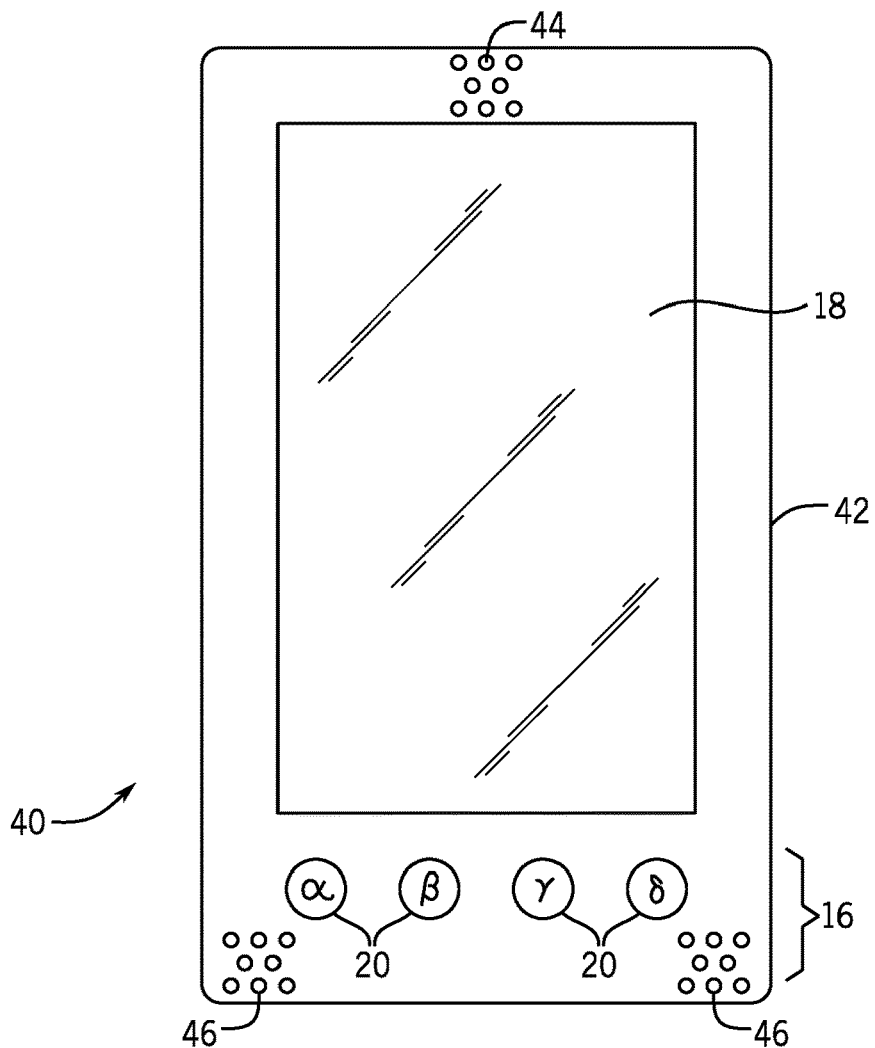
FIG. 3 is a front view of the electronic device in the form of a slate, in accordance with embodiments described herein.
Figure 4:
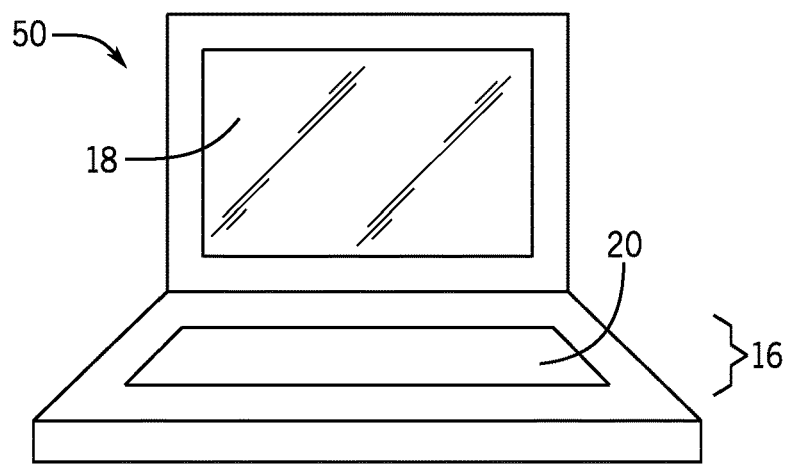
FIG. 4 is a perspective view of the electronic device in the form of a notebook computer, in accordance with embodiments described herein.

As may be appreciated, the electronic device 10 may take a number of different forms. As shown in FIG. 2, the electronic device 10 may take the form of a fitness band 30. The fitness band 30 may include an enclosure 32 that houses the electronic device 10 components of the fitness band 30. A band 34 may allow the fitness band 30 to be worn on the arm or wrist. The display 18 may display information related to the operation of the fitness band 30. Additionally or alternatively, the fitness band 30 may operate as a watch, in which case the display 18 may display the time. Input structures 20 may allow a person wearing the fitness band 30 navigate a graphical user interface (GUI) on the display 18.

The electronic device 10 may also take the form of a slate 40. Depending on the size of the slate 40, the slate 40 may serve as a handheld device, such as a mobile phone, or a tablet-sized device. The slate 40 includes an enclosure 42 through which several input structures 20 may protrude. The enclosure 42 also holds the display 18. The input structures 20 may allow a user to interact with a GUI of the slate 40. For example, the input structures 20 may enable a user to make a telephone call. A speaker 44 may output a received audio signal and a microphone 46 may capture the voice of the user. The slate 40 may also include a communication interface 16 to allow the slate 40 to connect via a wired connection to another electronic device.

A notebook computer 50 represents another form that the electronic device 10 may take. It should be appreciated that the electronic device 10 may also take the form of any other computer, including a desktop computer. The notebook computer 50 shown in FIG. 4 includes the display 18 and input structures 20 that include a keyboard and a track pad. Communication interfaces 16 of the notebook computer 50 may include, for example, a universal service bus (USB) connection.

Figure 5:
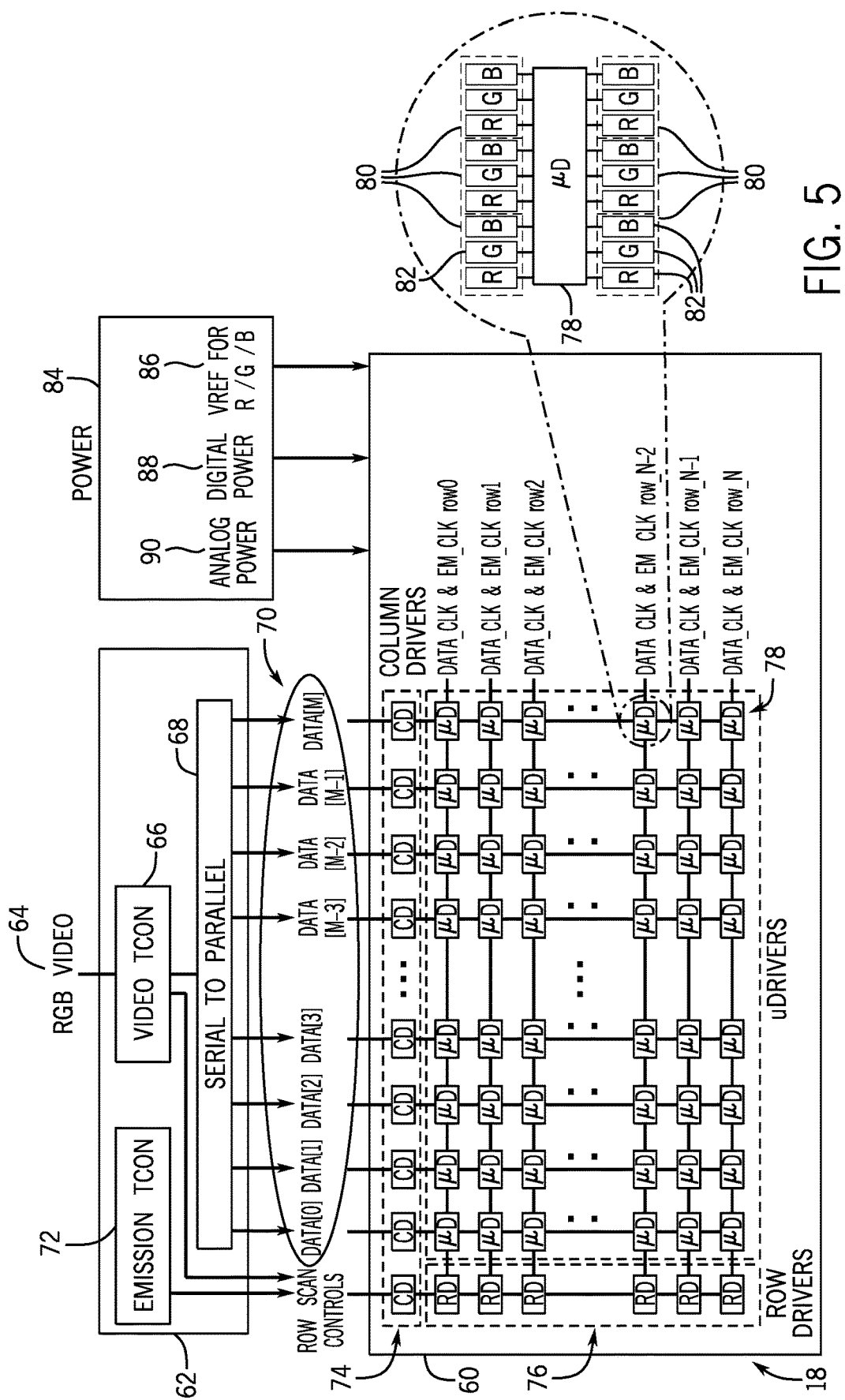
FIG. 5 is a block diagram of a µ-LED display that employs micro-drivers (µDs) to drive µ-LED sub-pixels with controls signals from row drivers (RDs) and data signals from column drivers (CDs), in accordance with embodiments described herein.

A block diagram of the architecture of the µ-LED display 18 appears in FIG. 5. In the example of FIG. 5, the display 18 uses an RGB display panel 60 with pixels that include red, green, and blue µ-LEDs as sub-pixels. Support circuitry 62 thus may receive RGB-format video image data 64. It should be appreciated, however, that the display 18 may alternatively display other formats of image data, in which case the support circuitry 62 may receive image data of such different image format. In the support circuitry 62, a video timing controller (TCON) 66 may receive and use the image data 64 in a serial signal to determine a data clock signal (DATA_CLK) to control the provision of the image data 64 in the display 18. The video TCON 66 also passes the image data 64 to serial-to-parallel circuitry 68 that may deserialize the image data 64 signal into several parallel image data signals 70. That is, the serial-to-parallel circuitry 68 may collect the image data 64 into the particular data signals 70 that are passed on to specific columns among a total of M respective columns in the display panel 60. As such, the data 70 is labeled DATA[0], DATA[1], DATA[2], DATA[3] DATA[M-3], DATA[M-2], DATA[M-1], and DATA[M]. The data 70 respectively contain image data corresponding to pixels in the first column, second column, third column, fourth column . . . fourth-to-last column, third-to-last column, second-to-last column, and last column, respectively.

The data 70 may be collected into more or fewer columns depending on the number of columns that make up the display panel 60.

As noted above, the video TCON 66 may generate the data clock signal (DATA_CLK). An emission timing controller (TCON) 72 may generate an emission clock signal (EM_CLK). Collectively, these may be referred to as Row Scan Control signals, as illustrated in FIG. 5. These Row Scan Control signals may be used by circuitry on the display panel 60 to display the image data 70. Although the emission timing controller (TCON) 72 is described as generating the emission clock signal, it should be noted that other circuit components (e.g., RDs 76, μDs 78) may also generate the emission clock signals.

In particular, the display panel 60 shown in FIG. 5 includes column drivers (CDs) 74, row drivers (RDs) 76, and micro-drivers (μDs or uDs) 78. Each μD 78 drives a number of pixels 80 having μ-LEDs as sub-pixels 82. Each pixel 80 includes at least one red μ-LED, at least one green μ-LED, and at least one blue μ-LED to represent the image data 64 in RGB format. Although the μDs 78 of FIG. 5 is shown to drive six pixels 80 having three sub-pixels 82 each, each μD 78 may drive more or fewer pixels 80. For example, each μD 78 may respectively drive 1, 2, 3, 4, 5, 6, 7, 8, 9, 10, 11, 12, or more pixels 80.

A power supply 84 may provide a reference voltage (VREF) 86 to drive the μ-LEDs, a digital power signal 88, and an analog power signal 90. In some cases, the power supply 84 may provide more than one reference voltage (VREF) 86 signal. Namely, sub-pixels 82 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of μ-LED.

To allow the μDs 78 to drive the μ-LED sub-pixels 82 of the pixels 80, the column drivers (CDs) 74 and the row drivers (RDs) 76 may operate in concert. Each column driver (CD) 74 may drive the respective image data 70 signal for that column in a digital form. Meanwhile, each RD 76 may provide the data clock signal (DATA_CLK) and the emission clock signal (EM_CLK) at an appropriate time to activate the row of μDs 78 driven by the RD 76. A row of μDs 78 may be activated when the RD 76 that controls that row sends the data clock signal (DATA_CLK). This may cause the now-activated μDs 78 of that row to receive and store the digital image data 70 signal that is driven by the column drivers (CDs) 74. The μDs 78 of that row then may drive the pixels 80 based on the stored digital image data 70 signal and the emission clock signal (EM_CLK).

In certain embodiments, a scrambler circuit 92 may be part of the display panel 60, the support circuitry 62, the CD 74 (not shown), the RD 76 (not shown), the μD 78 (not shown), or any other suitable device. The scrambler circuit 92 may scramble the order in which the emission pulses are designated to be provided to a pixel 80 or sub-pixel 82 during sub-frames of image data. As discussed above, by scrambling the order in which the pulses are provided to the pixel 80 or sub-pixel 82, the μD 78 may cause the display 18 to present fewer visual artifacts as compared to providing the pulses according to other orders.

Figure 6:
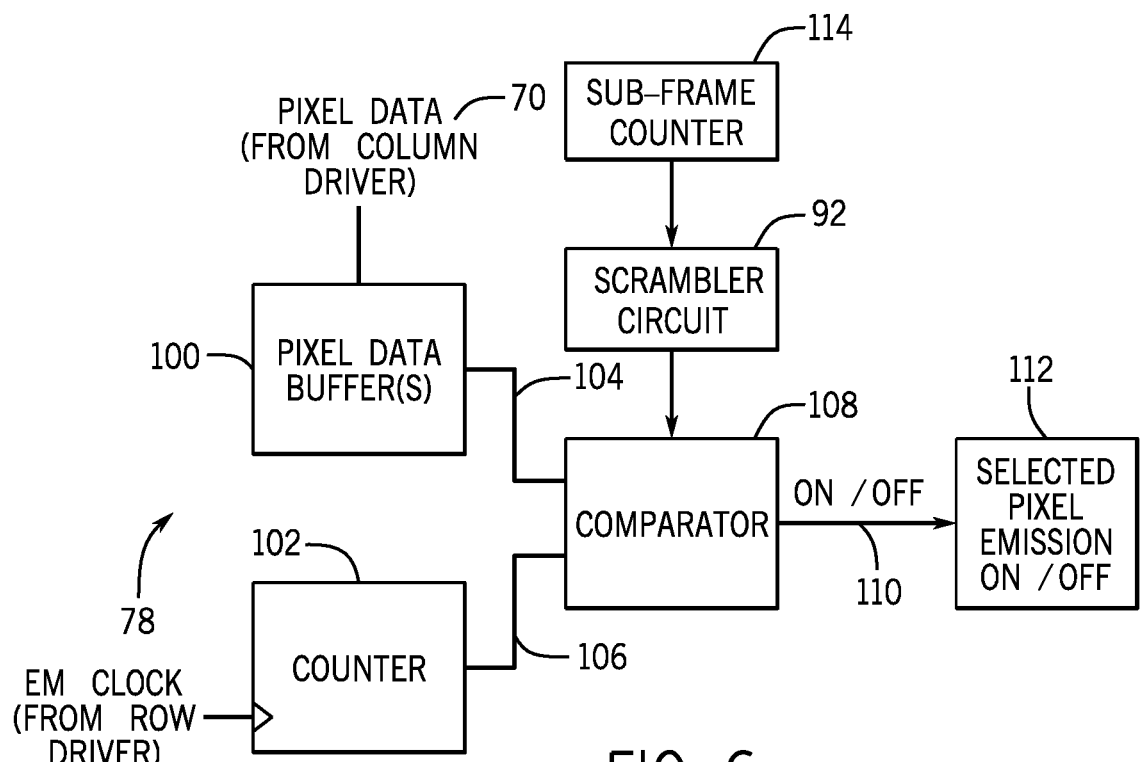
FIG. 6 is a block diagram schematically illustrating an operation of one of the micro-drivers (µDs), in accordance with embodiments described herein.

A block diagram shown in FIG. 6 illustrates some of the components of one of the μs 78. The μD 78 shown in FIG. 6 includes pixel data buffer(s) 100 and a digital counter 102. The pixel data buffer(s) 100 may include sufficient storage to hold the image data 70 that is provided. For instance, the μD 78 may include enough pixel data buffer(s) 100 to store image data 70 for three sub-pixels 82 at any one time (e.g., for 8-bit image data 70, this may be 24 bits of storage). It should be appreciated, however, that the pixel data buffer(s) 100 may include more or fewer buffers, depending on the data rate of the image data 70 and the number of sub-pixels 82 included in the image data 70. Thus, in some embodiments, the pixel data buffer(s) 100 may include as few buffers as to hold image data for one sub-pixel 82 or as many as suitable (e.g., 4, 5, 6, 7, 8, 9, 10, 11, 12, and so forth). The pixel data buffer(s) 100 may take any suitable logical structure based on the order that the column driver (CD) 74 provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the RD 76 may provide the emission clock signal (EM_CLK). A counter 102 may receive the emission clock signal (EM_CLK) as an input. The pixel data buffer(s) 100 may output enough of the stored image data 70 to output a digital data signal 104 represent a desired gray level for a particular sub-pixel 82 that is to be driven by the μD 78. The counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the signal 104, and an "off" state otherwise. The emission control signal 110 may be routed to driving circuitry (not shown) for the sub-pixel 82 being driven, which may cause light emission 112 from the selected sub-pixel 82 to be on or off. The longer the selected sub-pixel 82 is driven "on" by the emission control signal 110, the greater the amount of light that will be perceived by the human eye as originating from the sub-pixel 82.

In addition to the pixel data 70, the μD 78 may receive a sub-frame count from a sub-frame counter 114, which may indicate to the μD 78 a current sub-frame value for the pixel data 70 being displayed. The sub-frame counter 114 may thus provide a current sub-frame value to the scrambler circuit 92, which may include any suitable hardware device (e.g., look-up table) that may map the current sub-frame value to another sub-frame value. The comparator 108 may then use the scrambled sub-frame value to provide one or more emission pulses to the respective pixel according to the scrambled sub-frame value time slot.

Figure 7:
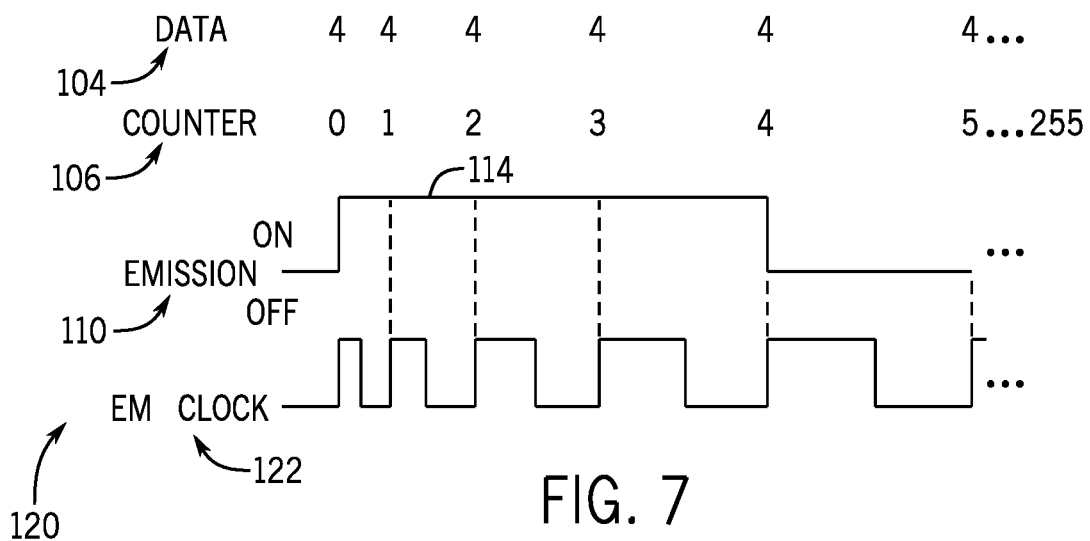
FIG. 7 is a timing diagram illustrating an example operation of the micro-driver (µD) of FIG. 6, in accordance with embodiments described herein.

A timing diagram 120, shown in FIG. 7, provides one brief example of the operation of the μD 78. The timing diagram 120 shows the digital data signal 104, the digital counter signal 106, the emission control signal 110, and the emission clock signal (EM_CLK) represented by numeral 122. In the example of FIG. 7, the gray level for driving the selected sub-pixel 82 is gray level 4, and this is reflected in the digital data signal 104. The emission control signal 110 drives the sub-pixel 82 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the data signal 104, the comparator 108 outputs the emission control signal 110 to an "off" state, thereby causing the selected sub-pixel 82 no longer to emit light.

It should be noted that the steps between gray levels are reflected by the timing between emission clock signal (EM_CLK) edges. That is, based on the way humans perceive light, to notice the difference between lower gray levels, the difference between the amount of light emitted between two lower gray levels may be relatively small. To notice the difference between higher gray levels, however, the difference between the amount of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON 72, may have increasingly longer differences between edges (e.g., periods) so as to provide a gamma encoding of the gray level of the sub-pixel 82 being driven.

Figure 8:
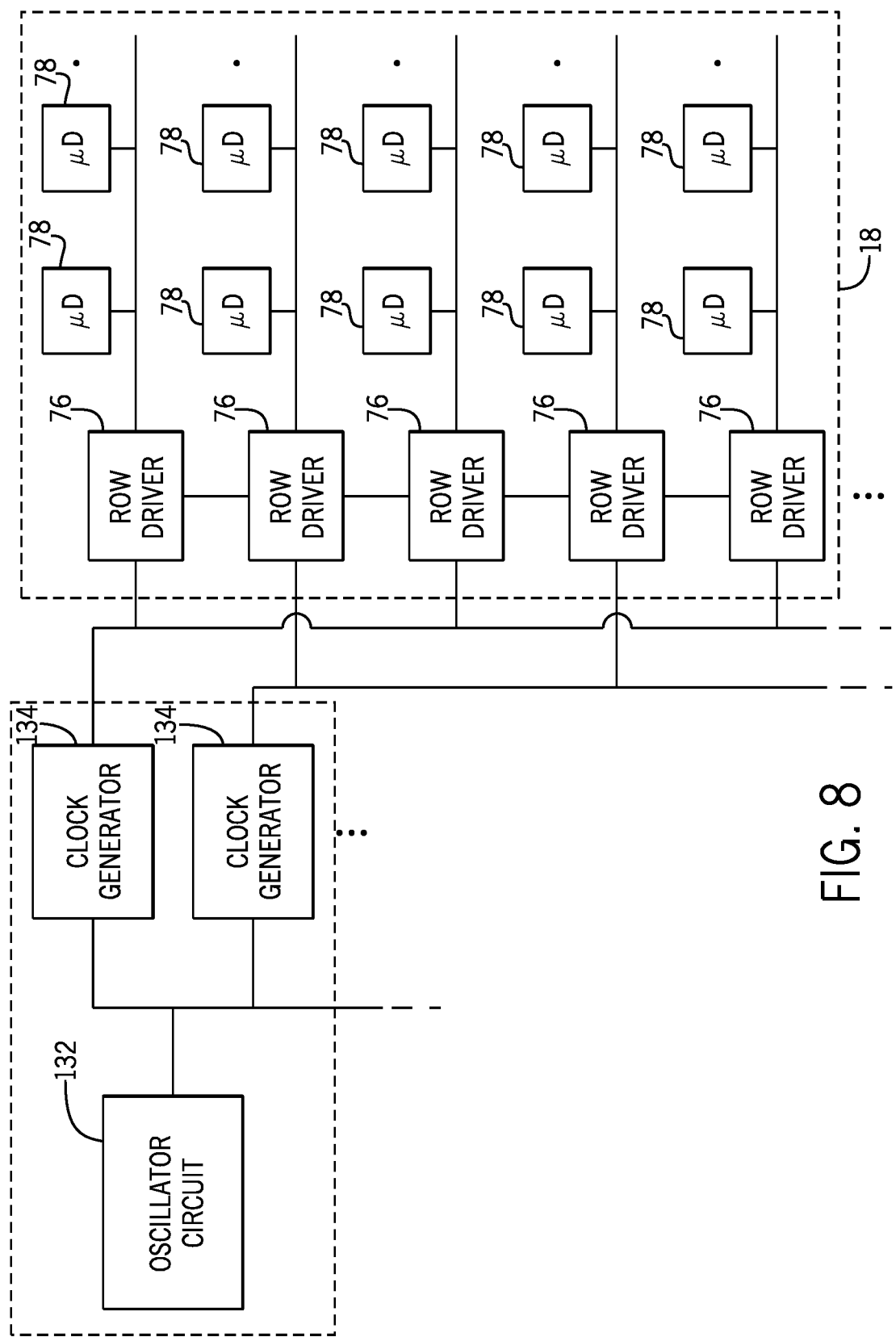
FIG. 8 is a block diagram illustrating example circuit components that may use an emission clock signal to control a pixel of a display of the electronic device of FIG. 1, in accordance with embodiments described herein.

With the foregoing in mind, FIG. 8 illustrates circuit components that may be part of the support circuitry 62 and the display 18. As discussed above, the support circuitry 62 may provide the emission clock signal (EM_CLK), which may be routed to a respective pixel 80 or sub-pixel 82 of the display 18. In one embodiment, the support circuitry 62 may include an oscillator circuit 132 that may generate a periodic, oscillating electronic signal, such as a sine wave or a square wave that may be used as a clock signal for determining an amount of time. In some embodiments, the oscillator circuit 132 may be coupled to one or more clock generators 134. The clock generators 134 may use the clock signal provided by the oscillator circuit 132 to generate an emission clock signal (EM_CLK) output by the emission (TCON) 72 discussed above.

In some cases, the clock generator 134 may provide different emission clock signals for pixels located along different rows, for sub-pixels 82 that output different colors, and for various other permutations. The RDs 76 may provide a clock signal to pixels located along the same row as the respective RD 76. In one embodiment, the clock generator 134 may provide emission clock signals to respective RDs 76, which may be coupled to a number of μDs 78. The RD 76 may then provide emission clock signals to the pixels 80 located along a particular row of the display 18 via the μDs 78.

Figure 9:
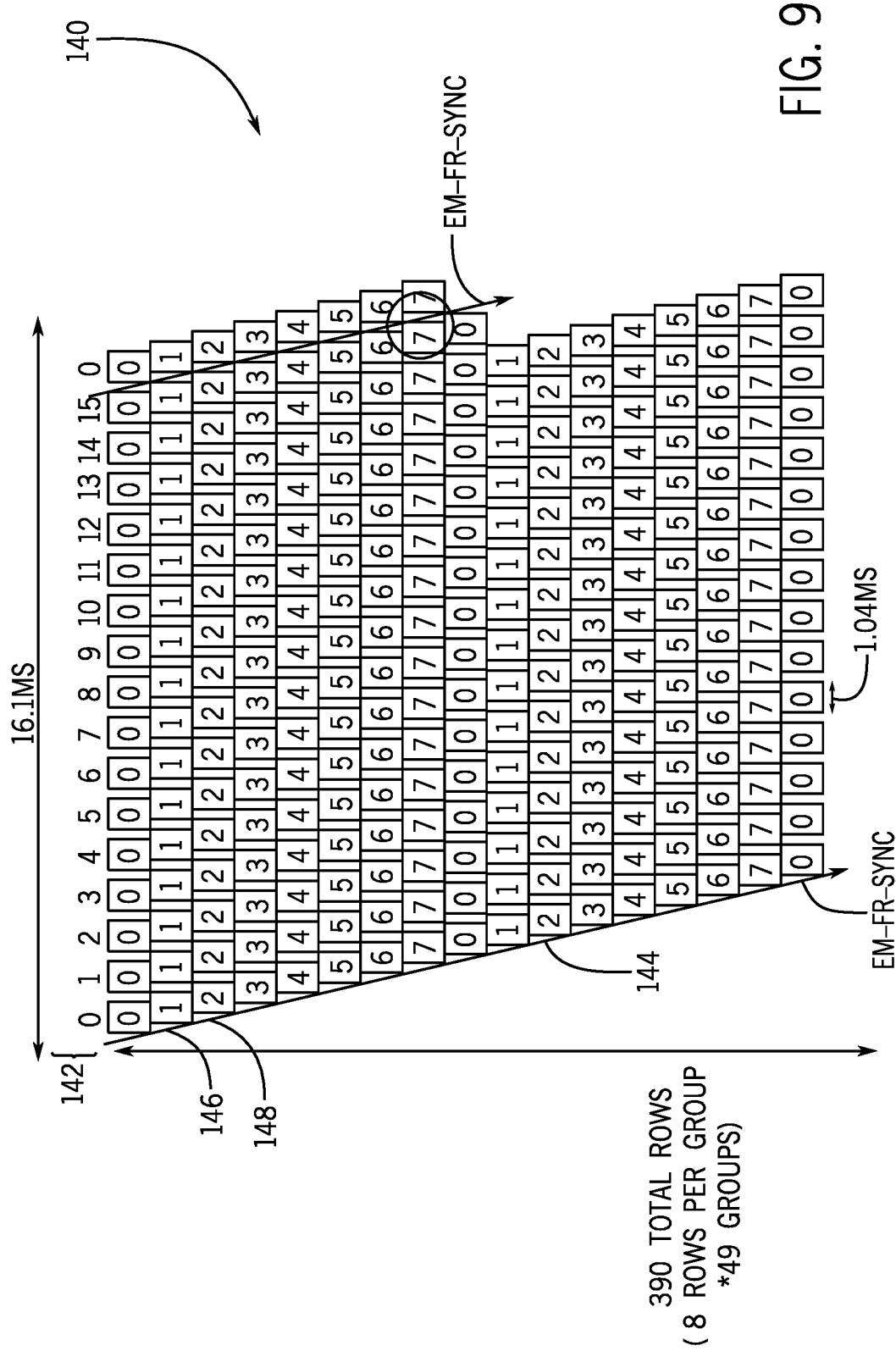
FIG. 9 illustrates a timing diagram that depicts 16 sub-frames or time slots during a single frame of image data, in accordance with embodiments described herein.
Figure 10:
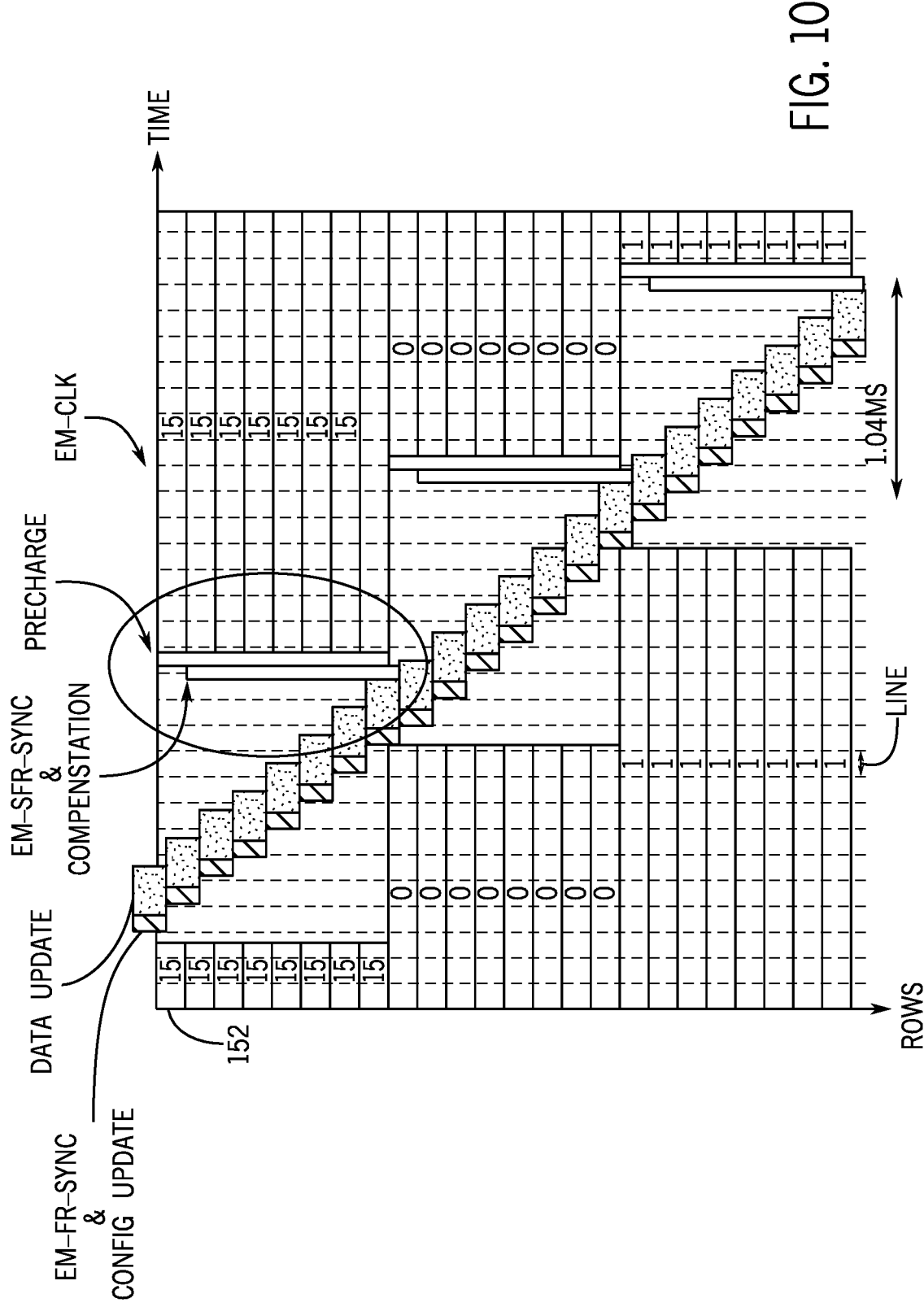
FIG. 10 illustrates a timing diagram that depicts eight rows of pixels in a display receiving emission clock signals during the same time sub-frame window, in accordance with embodiments described herein.

As mentioned above, in certain embodiments, the μD 78 may provide current pulses to a respective μ-LED during sub-frames of a frame of image data to cause the respective pixel (or sub-pixel) to depict a certain gray level. Keeping this in mind, FIG. 9 illustrates a timing diagram 140 that depicts 16 sub-frames (e.g., sub-frame 0-15) or time slots 142 during a single frame of image data. As shown in FIG. 10, each sub-frame time slot 142 may make up a portion of a frame of image data, as depicted in the timing diagram 140. For instance, each sub-frame window 146 for the topmost row of the display 18 (designated as "0") may provide up to five pulses, which corresponds to five bits of data. In addition, if an average value of the data provided by each sub-frame for a particular sub-frame window 146 is determined, the effective precision provided over the 16 sub-frames may be nine bits.

After each sub-frame window 146, a certain amount of time (e.g., 1.04 ms in 60 Hz display) may be available for pixel data update and the like. In one embodiment, a number of sub-frame windows 148 provided to the subsequent row of pixels 80 may be provided during a portion of the time interval that the topmost row of pixels 80 is receiving its emission signal. That is, the second row of pixels 80 of the display 18 may receive pulses during their respective sub-frame windows 148 during similar time intervals when the top row of pixels 80 receives its pulses. To enable this feature, the emission timing for the pixels 80 of the display 18 follows a timing slope 144, such that the topmost row of pixels 80 may first receive their respective emission pulses via respective μDs 78 at time T0 and the second row of pixels may begin to receive their respective emission pulses at time T1 after a delay from the time T0. This pattern may continue for each row of pixels in the display until the bottommost row of pixels has received their respective emission pulses. The delay may be provided to accommodate different independent clock circuits that may be used to provide emission clock signals to different portions of the display 18. In one embodiment, the timing slope 144 may be adjusted to support data update rates of 120 Hz and the like.

Depending on the number of independent clock circuits available to the display 18, each sub-frame window may receive emission pulses via an independent clock circuit. For example, FIG. 10 illustrates how eight rows of pixels 80 in the display 18 may receive emission clock signals during the same sub-frame window 152. By grouping multiple rows of pixels 80 together, the display 18 may accommodate a certain number of independent clock circuits to provide emission clock signals to the pixels 80 of the display. Referring briefly back to FIG. 9, eight different sub-frame windows (0-7) are illustrated. If each sub-frame window received its emission clock signals from an independent clock circuit, the display 18 may provide emission signals to up to 392 rows during a single frame of image data. The number of independent clock circuits available in the display 18 may depend on pin-out constraints of the RD 76, the μDs 78, the support circuitry 62, or other circuit components.

With the foregoing in mind, additional details with regard to embodiments in which the emission pulses may be provided during each sub-frame window 152 are discussed below with reference to FIGS. 11-13. For instance, FIG. 11 illustrates one embodiment in which gray level data may be provided to a pixel 80 or a sub-pixel 82 during sub-frame windows 152.

Figure 11:
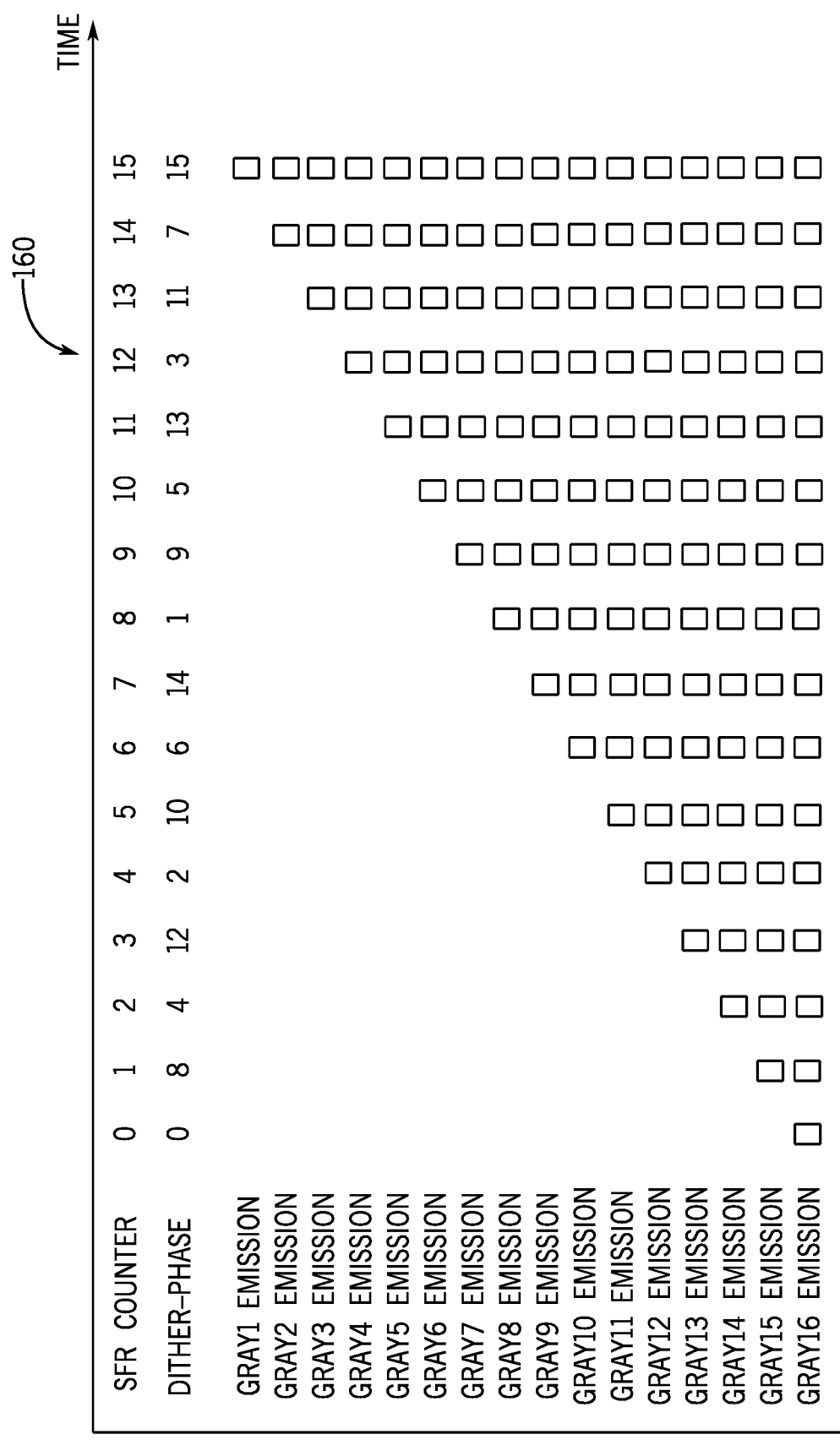
FIG. 11 illustrates one embodiment in which gray level data may be provided to a pixel or a sub-pixel of a display according to a linear order during sub-frame windows, in accordance with embodiments described herein.

Referring now to FIG. 11, FIG. 11 illustrates an emission scheme 160 that uses a linear order to depict gray levels in pixels 80 or sub-pixels 82. As shown in FIG. 11, 16 sub-frames (e.g., 0-15) may be available during a single frame of image data. As such, when attempting to depict a gray level of one via a sub-pixel 82, the μD 78 may provide one current pulse during the last sub-frame 15. Gray level 2 may then be depicted by providing two current pulses during sub-frames 14 and 15 at the end of the frame. This pattern may continue as illustrated in FIG. 11 to depict various gray levels.

For relatively low gray levels (e.g., 0-8), a viewer of the display 18 may detect visual artifacts because the sub-pixels 82 that display these gray levels are provided with current during one short period of time. As such, in one embodiment, the scrambler circuit 92, as discussed above, may scramble the order in which the emission pulses are to be provided to a pixel 80 or sub-pixel 82 during sub-frames of image data. As discussed above, by scrambling the order in which the pulses are provided to the pixel 80 or sub-pixel 82, the μD 78 may cause the display 18 to present fewer visual artifacts as compared to providing the pulses according to the linear order depicted in FIG. 11.

Figure 12:
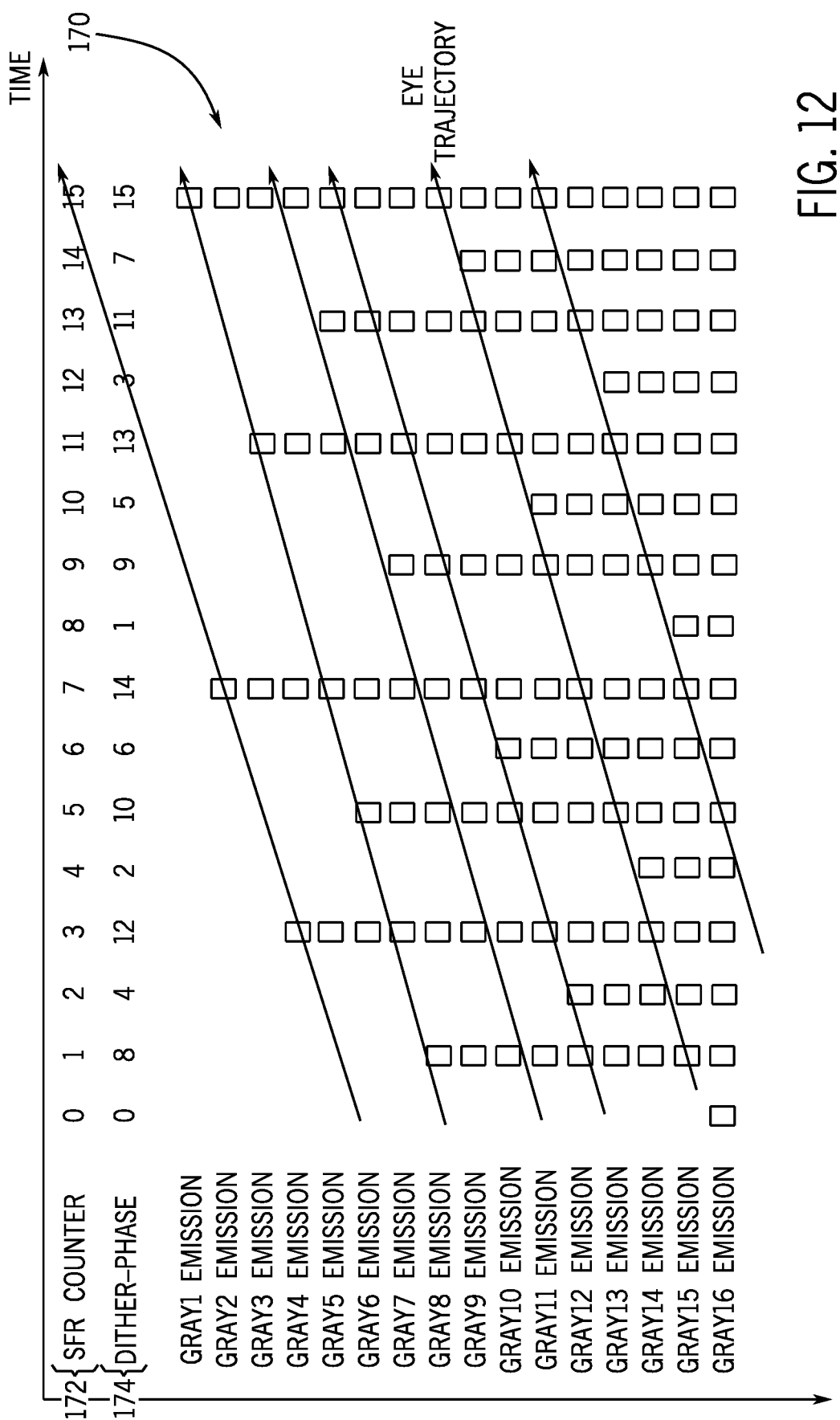
FIG. 12 illustrates one embodiment in which gray level data may be provided to a pixel or a sub-pixel of a display according to a scrambled order during sub-frame windows, in accordance with embodiments described herein.

By way of example, FIG. 12 illustrates a scrambled emission scheme 170 in which the sub-frame slots 142 that the current pulses are provided to the pixel 80 or sub-pixel 82 is scrambled, as compared to the linear order described above. In one embodiment, the order of the original sub-frame slots 142 (e.g., 0-15), as provided by the sub-frame counter 172, may be mapped to another order as represented by the dither phase 174. In the example provided in FIG. 12, each sub-frame counter value may be mapped to a dither phase value by employing a most-significant-bit (MSB) to most-significant-bit (MSB) flip operation. As such, the bit value of each sub-frame counter value reversed. For example, the sub-frame counter value of 0 (e.g., 0000) is mapped to the dither phase value of 0 (e.g., 0000), the sub-frame counter value of 1 (e.g., 0001) is mapped to the dither phase value of 8 (e.g., 1000), the sub-frame counter value of 2 (e.g., 0010) is mapped to the dither phase value of 4 (e.g., 0100), the sub-frame counter value of 13 (e.g., 1101) is mapped to the dither phase value of 11 (e.g., 1011), the sub-frame counter value of 14 (e.g., 1110) is mapped to the dither phase value of 7 (e.g., 0111), the sub-frame counter value of 15 (e.g., 1111) is mapped to the dither phase value of 15 (e.g., 1111), and so forth. Using the MSB-MSB flip operation may cause the display 18 to depict image data at the highest possible temporal frequency in which the display 18 may depict image data.

Figure 13:
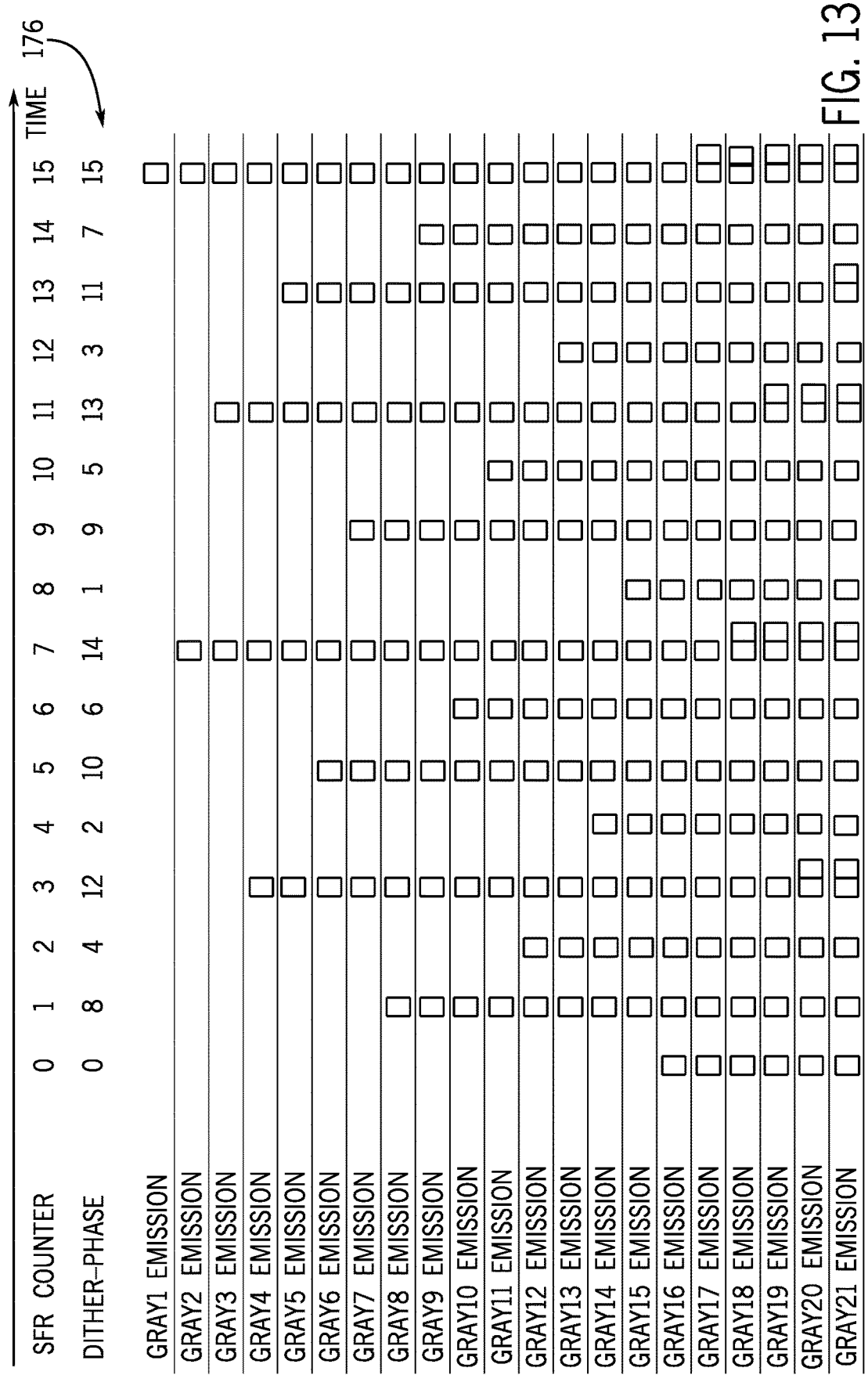
FIG. 13 illustrates one embodiment in which gray level data may be provided to a pixel or a sub-pixel of a display according to a scrambled order during sub-frame windows, in accordance with embodiments described herein.

In the same manner, FIG. 13 illustrates a scrambled emission scheme 176 in which the sub-frame slots 142 that the current pulses are provided to the pixel 80 or sub-pixel 82 is scrambled for higher gray levels, as compared to the scrambled order depicted in FIG. 12. In particular, the scrambled emission scheme 176 details how the emission pulses are provided during a respective sub-frame slot 142 in accordance with the dither phase value described above. That is, for example, gray level 17 includes a longer pulse during sub-frame 15, and gray level 18 includes longer pulses during sub-frames 7 and 15. In effect, each gray level depicted in a respective pixel uses the dither phase values to determine when to provide pulses to the respective LED.

As discussed above, the scrambler circuit 92 may perform the scrambling operation detailed above. In this way, the hardware costs of implementing the scrambled emission scheme 170 is minimal, and space within the display 18 may be preserved for various other circuit components (e.g., clock circuits). As a result of presenting gray levels during the sub-frame slots 156 mapped according to the dither phase 174, the pulses are provided to a pixel 80 or sub-pixel 82 in a more evenly distributed manner over the entire frame of image data. A viewer's eye trajectory may observe a gray ramp of 0, 2, 6, 8, 10, 14, and 16, which may reduce the appearance of visual artifacts in the low gray levels. Moreover, by using the scrambled emission scheme 170, the emission rate for the display 18 may be increased without increasing the amount of power used by the display 18. Although the scrambled emission scheme 170 has been detailed with respect to a MSB to MSB flip, it should be noted that a number of other suitable mapping schemes may be used to evenly distribute emission pulses over a frame of image data.

Figure 14:
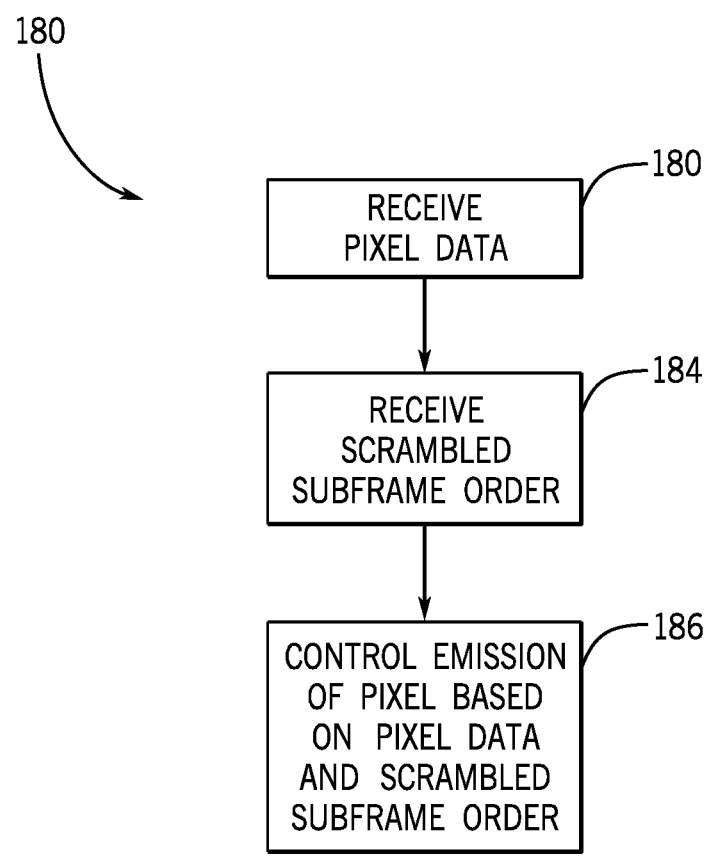
FIG. 14 illustrates a flow chart of a method that may be employed by the to control emission rates to pixels or sub-pixels in a display according to a scrambled order, in accordance with embodiments described herein.

With the foregoing in mind, FIG. 14 illustrates a flow chart of a method 180 that may be employed by the μD 78 or other like device to control emission rates to pixels 80 or sub-pixels 82 according to a scrambled emission scheme. Referring to FIG. 14, at block 182, the μD 78 may retrieve the pixel data from the pixel data buffer 100 or the like. Before transmitting the emission pulses to the pixel 80 or sub-pixel 82, at block 184, the μD 78 may receive a scrambled sub-frame order (e.g., dither phase) via the scrambler circuit 92 or the like. As discussed above, the scrambled sub-frame order may map the sub-frame counter 172 to dither phase 174. At block 186, the μD 78 may emit the emission pulses according to the pixel data during the sub-frame slots as provided according to the dither phase.

Figure 15:
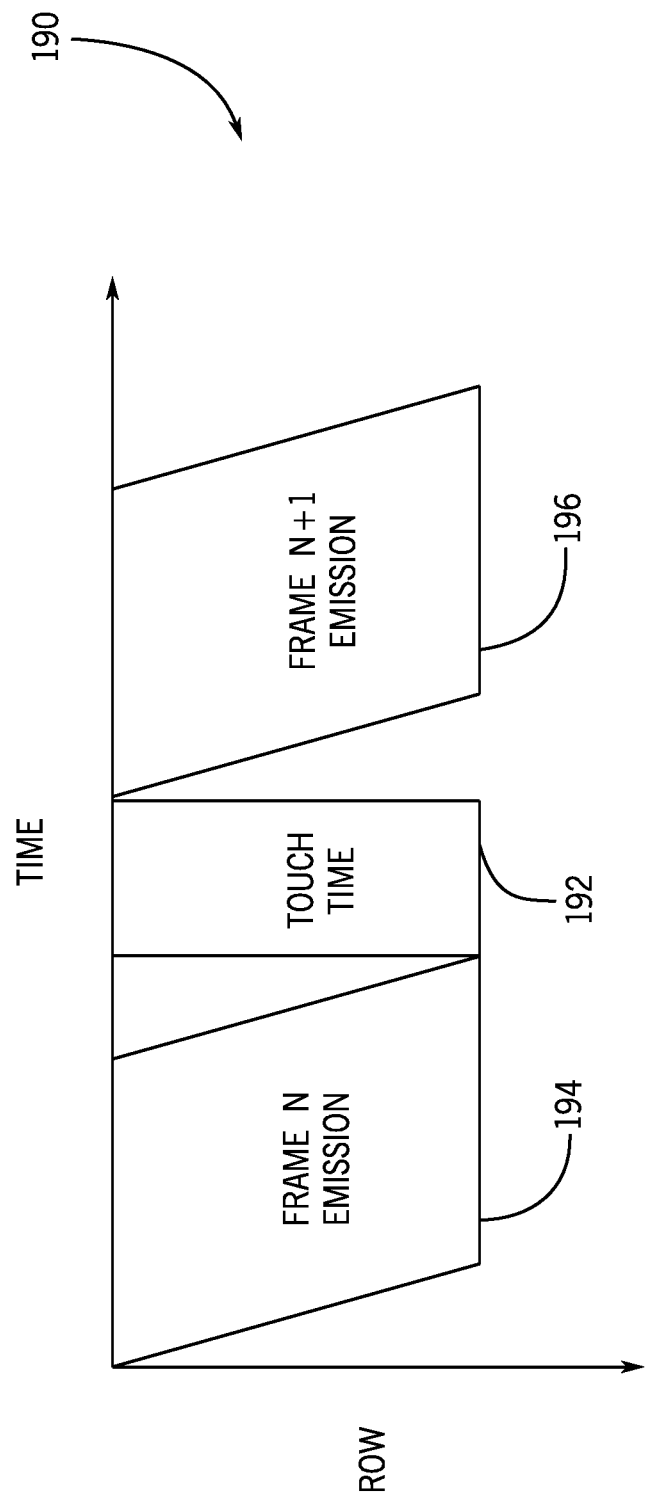
FIG. 15 illustrates an example timing diagram in which a touch time period is provided between the emission of two frames of image data, in accordance with embodiments described herein.

It should be noted that the previous discussions related to the sub-frame slots 142 provided within the frame of image data are useful for displays 18 that do not include touch input capabilities. That is, since the sub-frame slots 142 are provided throughout the frame of image data, time is not provided within the frame or between frames to detect touch inputs. Moreover, to detect touch inputs, the display 18 should include a touch time when image data is not being depicted via the display 18. For example, FIG. 15 illustrates an example timing diagram 190 in which a touch time period 192 is provided between the emission of two sub-frames 194 and 196 of image data.

Figure 16:
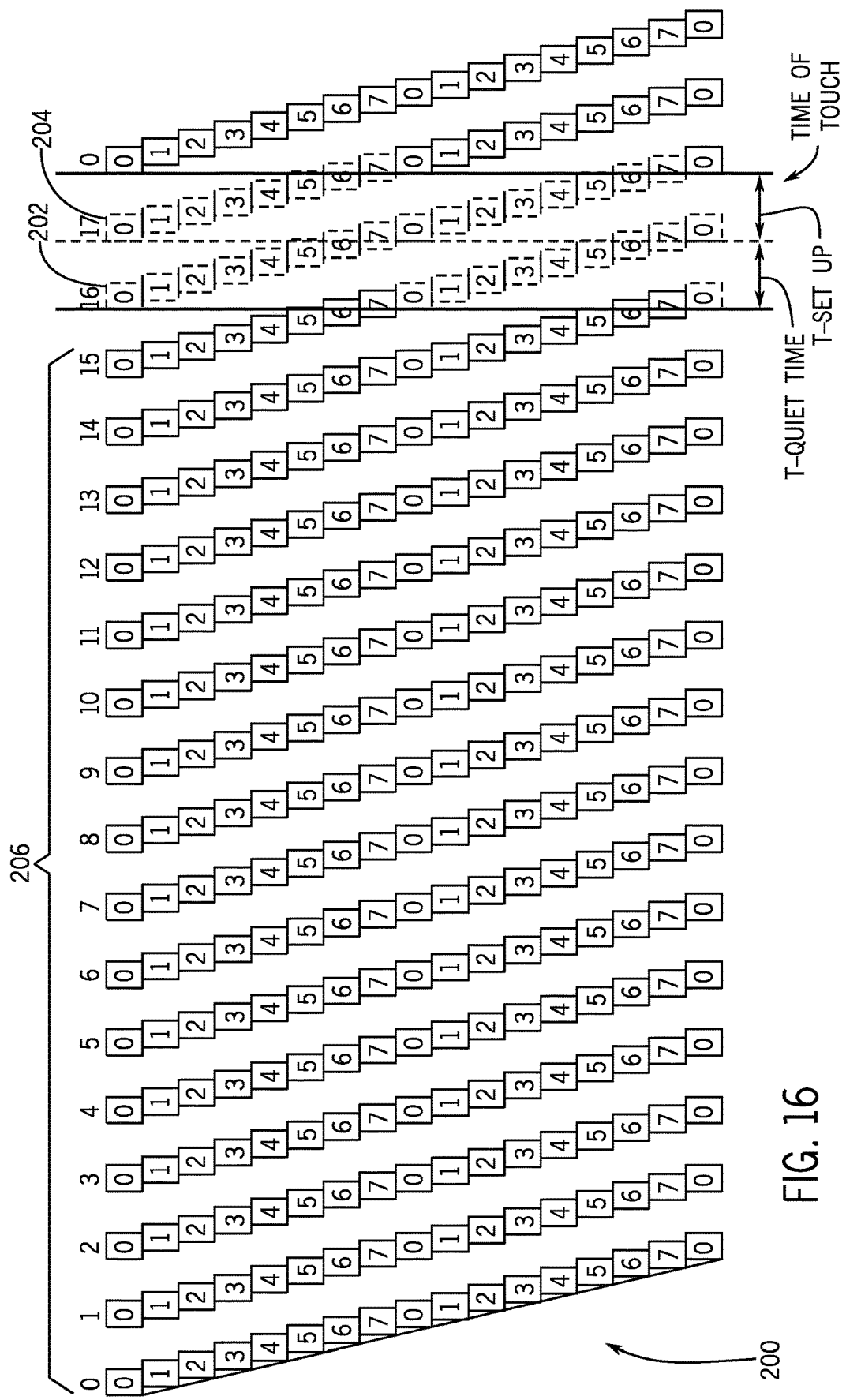
FIG. 16 illustrates a timing diagram in which two phantom sub-frame slots 2 are added to a set of sub-frames that provide emission pulses, in accordance with embodiments described herein.

Since the emission pulses are provided to the pixels 80 or sub-pixels 82 during sub-frame slots 142 according to a timing slope 144, the μD 78 or like device may create the touch time period 192 by adding two or more phantom sub-frames in which emission signals are not provided to the display 18 and image data is not depicted by the display 18 between frames. For instance, FIG. 16 illustrates a timing diagram 200 in which two phantom sub-frame slots 202 and 204 are added to a set of sub-frames 206 used to provide emission pulses. In a 60 Hz display, since the total number of sub-frames is 18 in the illustrated embodiment, each sub-frame may be 0.926 ms (16.67/18). It should be noted that additional or fewer sub-frames may be used to display image data to allow for shorter or longer touch periods per frame.

In any case, the first phantom sub-frame 202 may cause the respective μD 78 to stop the emission signal for the respective pixel 80 or respective row of pixels 80. The respective μD 78 may then wait for the second phantom sub-frame 204 to complete before resuming receiving emission signals for displaying image data. The first half of the time after the first phantom sub-frame 202 begins may corresponds to a set up time (t_set up) to allow the μDs 78 to stop emitting emission signals, and the second half of the time (t_quiet time) after the set up time may correspond to the touch time period 192 when the display 18 may receive touch inputs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. A display device, comprising:
a plurality of pixels configured to display image data on a display; and
a circuit configured to:
receive pixel data comprising a gray level for at least one pixel of the plurality of pixels, wherein the pixel data corresponds to a frame of image data, wherein the frame of image data is associated with a first emission rate frequency, and wherein the frame of image data comprises a plurality of sub-frames, and wherein the pixel data is configured to cause the circuit to provide at least one current pulse to the at least one pixel according to a first order of the plurality of sub-frames using a second emission rate frequency greater than the first emission rate frequency;

receive a second order of the plurality of sub-frames in response to the gray level being below a threshold, wherein the second order is mapped with respect to the first order such that the at least one current pulse is distributed across the frame of image data or applied closer to a middle of the frame of image data as compared to the first order, and wherein the at least one current pulse is provided to the at least one pixel according to the second order using the second emission rate frequency, thereby reducing one or more visual artifacts depicted on the display when the at least one current pulse is provided to the at least one pixel according to the first order.

2. The display device of claim 1, wherein the first order corresponds to a linear order.

3. The display device of claim 1, wherein the second order is determined based on a most-significant-bit (MSB) to most-significant-bit (MSB) flip with respect to a plurality of values associated with the first order.

4. The display device of claim 1, wherein the circuit is a micro-driver circuit directly coupled to the at least one pixel.

5. The display device of claim 1, wherein the plurality of sub-frames comprises sixteen sub-frames when the display is configured to refresh the pixel data at 60 Hz.

6. The display device of claim 1, comprising a plurality of clock circuits, wherein each clock circuit of the plurality of clock circuits is configured to provide a respective emission clock signal to a respective portion of a plurality of rows of pixels in the display.

7. The display device of claim 1, wherein the circuit is configured to:
provide a first current pulse of the at least one current pulse to a first pixel of the at least one pixel during a first time interval; and
provide a second current pulse of the at least one current pulse to a second pixel of the at least one pixel during a second time interval, wherein the first time interval and the second time interval overlap each other.

8. The display device of claim 7, wherein the second time interval starts an amount of time after the first time interval starts.

9. The display device of claim 8, wherein the circuit is configured to provide a third current pulse of the at least one current pulse to a third pixel of the at least one pixel during a third time interval, wherein the first current pulse, the second current pulse, and the third current pulse are delayed with respect to each other according to a timing slope.

10. A micro-driver circuit configured to control an operation of a pixel in a display, comprising:
a circuit configured to:
receive pixel data comprising a gray level value associated with a frame of image data for the pixel, wherein the frame of image data is associated with a first emission rate frequency;
determine a number of emission pulses to provide to the pixel based on the gray level value;
determine a first pattern for the number of emission pulses to provide to the pixel based on a first order of a plurality of sub-frames within the frame of image data to emit, using a second emission rate frequency greater than the first emission rate frequency;
determine a second pattern for the number of emission pulses to provide to the pixel based on a second order of the plurality of sub-frames in response to the gray level value being below a threshold, wherein the second order is configured to distribute the number of emission pulses across the frame of image data such that the number of emission pulses are distributed across the frame of image data as compared to the first order; and
emit the number of emission pulses to the pixel according to the second pattern using the second emission rate frequency.

11. The micro-driver circuit of claim 10, wherein the plurality of sub-frames comprise at least two phantom frames, wherein the display is configured to receive one or more touch inputs during the at least two phantom frames.

12. The micro-driver circuit of claim 11, wherein the number of emission pulses are not emitted during the at least two phantom frames.

13. The micro-driver circuit of claim 10, wherein the first pattern for the number of emission pulses corresponds to a linear order.

14. The micro-driver circuit of claim 10, wherein the second pattern for the number of emission pulses corresponds to a scrambled order.

15. The micro-driver circuit of claim 10, wherein the second pattern is determined based on a most-significant-bit (MSB) to most-significant-bit (MSB) flip with respect to a plurality of values associated with the first pattern.

16. The micro-driver circuit of claim 10, wherein a clock circuit of a plurality of clock circuits is configured to provide a respective emission clock signal to a respective portion of a plurality of rows of pixels in the display.

17. A method, comprising:
receiving, via circuitry, pixel data comprising a gray level to be depicted on a pixel in a display device during a frame, wherein the frame is associated with a first emission rate frequency;
determining, via the circuitry, a first set of sub-frames of a plurality of sub-frames of the frame to provide one or more emission pulses to the pixel using a second emission rate frequency greater than the first emission rate frequency;
determining, via the circuitry, a second set of sub-frames of the plurality of sub-frames of the frame to provide the one or more emission pulses to the pixel in response to the gray level being below a threshold, wherein the first set of sub-frames is mapped to the second set of sub-frames such that the one or more emission pulses are applied closer to a middle of the frame as compared to the first set of sub-frames; and
providing, via the circuitry, the one or more emission pulses to the pixel during the second set of sub-frames using the second emission rate frequency.

18. The method of claim 17, wherein the plurality of sub-frames comprise at least two phantom frames that do not include the one or more emission pulses.

19. The method of claim 18, wherein the at least two phantom frames are positioned at an end of the frame.

20. The method of claim 18, wherein the display device is configured to detect one or more touch inputs during the at least two phantom frames.

\* \* \* \* \*